Patented Oct. 1, 1940

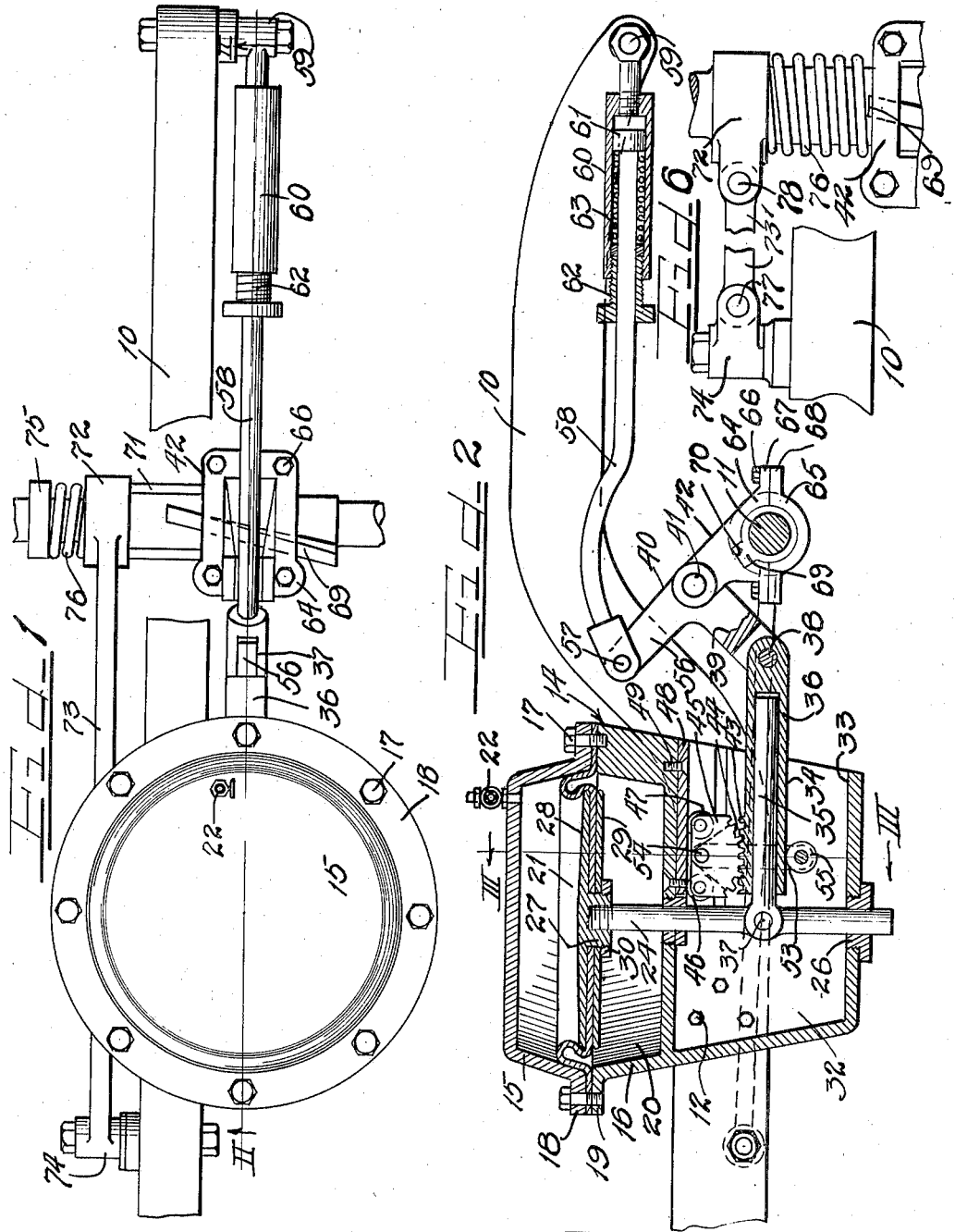

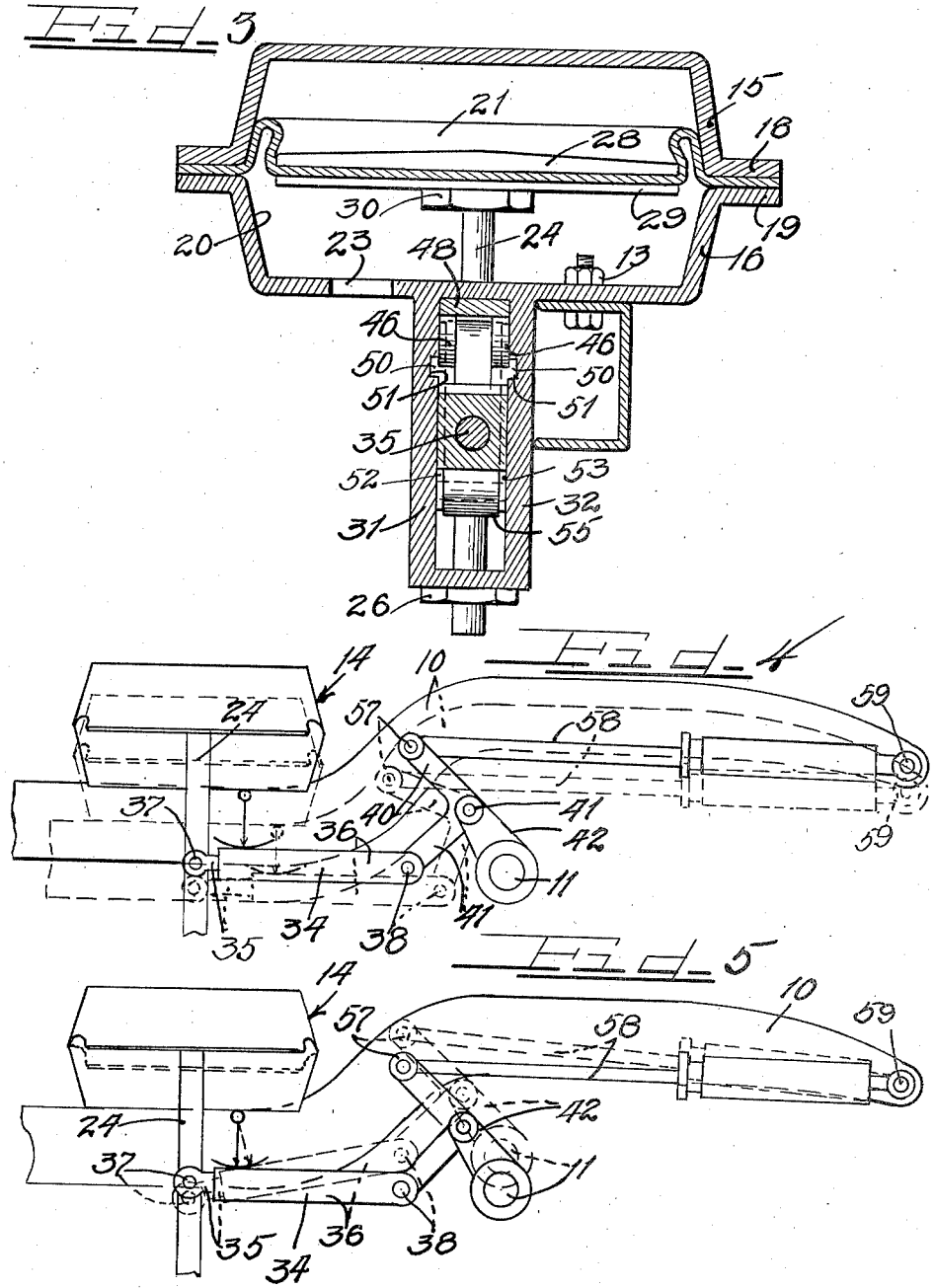

2,216,327

UNITED STATES PATENT OFFICE 2,216,327

VEHICLE SUSPENSION

Clyde Z. Smith, Scarsdale, N. Y.

Application December 3, 1937, Serial No. 177,840

13 Claims. (Cl. 267—15)

The present invention relates in general to suspension means for vehicles such as automobiles and the like, and is more particularly concerned with improvements in devices for such purpose, which will enable the "sprung" weight of any vehicle to be flexibly supported and road shocks eliminated in a more satisfactory manner than heretofore.

The conventional methods heretofore employed in an effort to secure a satisfactory flexible vehicle support by the use of steel springs of various shapes and sizes, or by means of an elastic fluid such as air under compression in devices of various forms, including pneumatic tires, have met with only mediocre success. Such devices can at most eliminate only a small portion of the road shocks at any ordinary vehicle speed, because of the inherent spring and compressed air characteristics of returning all of the accumulated energy which has been imparted to such media.

In the present invention, atmospheric pressure is utilized as the basic force for flexibly supporting the sprung weight of the vehicle and for the elimination of road shocks. The supporting element being the pressure of the atmosphere, which may be considered as being unconfined, it may be utilized to exert a substantially uniformly constant force or pressure against a vacuum confining diaphragm or piston, irrespective of whether the piston is at rest or in motion. The effective supporting power or force will be in direct proportion to the area of the piston by means of which the force is utilized. It will, therefore, be apparent that the atmospheric pressure is susceptible of being utilized in a properly designed device to provide a flexible support of uniform magnitude, without accumulating or returning energy, if the device be so arranged as to keep its force in balanced relation with the load and shock forces of the vehicle.

Broadly considered, the invention consists of a vehicle suspension device, one or more of which may be used on a vehicle. The device comprises a vaccum chamber by means of which atmospheric pressure is caused to act upon a piston or diaphragm. This force is applied to one end of a main supporting lever which is connected at its other end to parts integral with the unsprung portion of the vehicle, and the lever is rotatably attached at a point between its ends to parts integral with the sprung portion of the vehicle. Automatic means are provided to relatively vary the lever arms of the forces acting on the main supporting lever in response to relative variations of the forces due to changed conditions, this variation of the force lever arms being such as to tend to keep the forces in a normal balanced relation and restore the mechanism to normal balanced condition whenever the acting forces become unbalanced.

The device is arranged to operate in response to variations in the total sprung weight due to changes in the live load; to variations of the sprung weight due to a shifting of the load within the vehicle, as by a relocation of the live load or as a result of any other of several causes; to variations resulting from centrifugal force when changing the direction of movement of the vehicle, as when rounding a curve or turning a corner; and to variations resulting from mass inertia of the vehicle during starting, acceleration, braking, retarding, and stopping thereof.

Changes in atmospheric pressure due to changes in altitude or barometric weather conditions are relatively so small in relation to the total pressure that it is not necessary as a rule to compensate the device for such changes. However, means are provided in the device for compensating it for these changes, where the changes may be of extreme or of prolonged duration.

It is an object of the herein described invention to provide a suspension device which is stronger, more flexible, and yet less re-active than the devices of like character heretofore utilized for supporting the sprung weight of a wheeled vehicle and its live load.

A further object of the invention is to provide an improved device of the character described herein, which utilizes atmospheric pressure as the basic force producing medium.

A further object of the invention is to provide an improved vehicle suspension device of such character that the forces due to load changes and road shocks will be opposed by and balanced by a force of substantially constant or uniform character.

Another object of the invention is to provide an improved suspension device in which the acting forces are normally maintained in balanced relation, and which is automatically responsive to restore any unbalancing of these forces to a normal balanced relation.

A still further object of the invention is to provide a vehicle suspension device which will operate to keep the body of the vehicle on an even keel when forces are acting which would normally cause a tilting of the vehicle body, and which may, if desired, be compensated to automatically produce under certain conditions a "banking" effect within the vehicle itself.

Still other objects of the invention are to obtain a more uniform traction of the vehicle wheels; reduce wear and tear on road surfaces and the sprung portion of the vehicle and its material load; provide greater comfort for vehicle passengers; and to make possible the substitution of solid tires for pneumatic tires on vehicles, without sacrificing the above mentioned objects.

Other objects and features of the invention will more fully appear from the following detailed description taken in connection with the accompanying drawings, which illustrate a single embodiment thereof, and in which:

Figure 1 is a fragmentary plan view showing a device embodying the features of the present invention connected to the sprung and unsprung parts of a vehicle;

Figure 2 is a fragmentary elevational view of the same, with a section taken substantially on line II—II of Figure 1 to illustrate the cooperative instrumentalities of the device;

Figure 3 is a transverse sectional view through the basic force creating part on the device, taken substantially on line III—III of Figure 2;

Figures 4 and 5 are views schematically illustrating the operation of the device under various conditions; and Figure 6 illustrates an alternative radius rod construction and arrangement of associated parts where it is connected with the vehicle axle.

As shown on the drawings:

Although it is contemplated that a number of the suspension devices incorporating the features of the herein described invention may be mounted on a vehicle, it is thought that it will be sufficient to illustrate only one of the devices. For this purpose the device is disclosed on the drawings as being mounted adjacent the right hand rear wheel of a vehicle such as an automobile having a conventional frame 10 and axle 11, these parts respectively comprising sprung and unsprung portions of the vehicle. In practice, it would be desirable to mount one of the devices adjacent each wheel of the vehicle.

Mounted on the frame 10 of the vehicle frame structure, as by bolts 12 and 13, is a housing generally indicated at 14.

This housing comprises upper and lower dished portions 15 and 16 which are disposed in confronting relation and secured together by means of a plurality of bolts 17 arranged to extend through rim flanges 18 and 19 formed respectively on the dished portions.

The portions 15 and 16, when secured together, define a chamber 20 which is separated into upper and lower compartments by means of a flexible diaphragm 21 having its marginal edge clampingly secured between the rim flanges 18 and 19.

The upper compartment communicates with a valve connection 22 by means of which the upper compartment may be connected to an air exhausting device (not shown) by means of which a vacuum may be effected in the upper compartment. The lower compartment is provided with an opening 23, as shown in Figure 3, which is in communication with the atmosphere.

Supported on the lowermost portion of the housing is a rod 24, this rod being mounted for vertical axial movements in anti-friction bearings 25 and 26.

The uppermost end of the rod 24 threadedly engages a downwardly extending hub 27 which is disposed at the center of and integrally formed with a clamping plate 28 on the upper side of the flexible diaphragm. The hub 27 is extended through a second clamping member 29 on the lower side of the flexible diaphragm. The two clamping members are actuated to clamped position against the diaphragm by means of a nut 30 in threaded engagement with the hub 27.

The portion of the housing below the chamber 20 is formed into a hollow compartment having parallel side walls 31 and 32, this compartment being open at one end as shown at 33. Extending from this compartment through the opening 33 is a lever 34 which is composed of a pair of members 35 and 36 in telescopic relation. The outermost end of the member 35 is pivotally connected as shown at 37 to the rod 24, and the outermost end of member 36 is pivotally connected as shown at 38 to an arm 39 of a right angled bell crank 40. The bell crank is pivoted as shown at 41 at its apex to an axle bracket 42.

The other end of member 36 is provided with a rack having teeth 43 which mesh with teeth 44 of a segmental gear construction formed on the lower surface of a fulcrum block 45.

The block 45 is arranged for longitudinal movement between the walls 31 and 32 and at its top is provided with spaced rollers 46 and 47. These rollers are supported in anti-friction bearings on the block and are arranged to roll upon a hardened steel plate 48 which is secured in proper position to the casing as by screws 49.

For additionally supporting the block for longitudinal movements, the block is provided, as shown in Figure 3, with lateral tongues 50 which are disposed for sliding movement in cooperatively associated grooves 51 formed in the walls 31 and 32.

The teeth 43 and 44 are retained in mesh at all times by a pair of swingable arms 52 and 53, which are pivoted at their uppermost ends to the block as shown at 54. The lowermost ends of these arms pivotally support a roller 55 adapted to bear against the lower side of member 36 and yet permit sliding movement of member 36 relative to member 35.

The other arm 56 of the bell crank 40 is pivotally connected at its outer end, as indicated at 57, to a load control rod or link 58. The other end of this rod is pivotally connected, as indicated at 59, to the vehicle frame 10.

The load control rod is capable of variations in length, which is accomplished by sectionalizing the rod and providing one of these sections with a rigidly connected sleeve 60 for reciprocably receiving therein a headed end portion 61 formed on the other section of the rod. The end of the sleeve which receives the latter rod section therein is threaded to receive a threaded adjusting bushing 62 which also surrounds the rod section. Disposed within the sleeve 60 is a coiled spring 63 which surrounds the rod section within the sleeve and has one end abutting the head portion 61 and its other end in engagement with the inner end of the bushing 62. It will be evident that by screwing the bushing 62 inwardly and outwardly, the compression of the spring 63 may be readily adjusted. With this arrangement, when the rod 58 is lengthened, the spring 63 will be additionally compressed, and when the ends of the rod are free to move, this spring will act to cause a shortening of the rod 58. Although not shown, a conventional fluid check may be utilized, if desired, in connection with the arrangement described above, for enabling lengthening and shortening of the rod 58 in a more gradual manner.

The axle bracket 42 is constructed with upper and lower axle surrounding portions 64 and 65 which are adapted to be clamped together by means of bolts 66 which extend through confronting flanges 67 and 68 on the axle surrounding portions. This bracket is not tightly clamped to the axle, but is free to move longitudinally thereof, and is guided in this movement by means of a key 69 fixedly associated with the axle, this key being in sliding engagement with a keyway 70 in the axle bracket.

The axle bracket is also provided with an arcuate extension 71 which partially surrounds the axle and at its outer end forms a pivotal connection for an end 72 of a radius rod 73. The other end of this radius rod is pivotally connected, as indicated at 74, to the vehicle frame 10.

Spaced from the end 72 of the radius rod pivotal connection, there is secured to the axle a collar 75 which forms an abutment for one end of a coil spring 76 which surrounds the shaft and has its other end abutting the end 72 of the radius rod 73.

The key 69, it will be observed, is spiraled in a clockwise direction. The frame 10, radius rod 73, axle bracket 42, housing 14, and all the interconnected linkages between the parts of the device are thus movable as a unit against the spring 76 longitudinally of the axle. This movement will cause rotation of the axle bracket 42 for a purpose which will subsequently be explained more fully. All the suspension devices mounted on the right side of the vehicle will be equipped with keys 69 which are spiraled in a clockwise direction. However, where the devices are mounted on the left side of the vehicle, the keys will be spiraled in the opposite direction, or counterclockwise.

While a specific arrangement of parts and manner of installing these parts is described herein, the invention is, of course, not to be limited as to sizes and shapes of the various parts. Obviously, each type of vehicle will require sizes and shapes calculated to amply take care of its weight, and the forces and force lever arms will necessarily have to be calculated for any particular vehicle. Moreover, the respective lever arms will have to be so proportioned as to maintain a proper balanced relation within the operating range of the device for the forces which are being controlled and utilized.

Referring to Figures 4 and 5, the operation of the device will now be described.

There are two primary different conditions of operation of the device, which may take place independently or simultaneously. The first condition has to do with the balancing effect that takes place when load is added to or removed from the vehicle body, and the second, the operation of the device due to raising and lowering movements of the axle as a result of the wheel's moving over an uneven surface.

For purposes of illustration, let it be assumed that the device is so proportioned that the effective lever arm length of member 36 from the point of contact with the fulcrum block to its pivoted end 38 is 10½ inches and that the effective length of the lever arm from the fulcrum to the pivot point 37 of member 35 is 3 inches; that the flexible diaphragm is of such size as to produce an acting force of 2,160 pounds in the rod 24; and that the spring 63 is designed to change its length ¾ inch for each 154 pounds applied thereto. If the weight of the vehicle is such, for example, as to apply a force of 617 pounds at the pivot 38, the telescopic lever 34 will be in substantially a horizontal position, and the forces of 617 pounds and 2,160 pounds will be in balanced relation due to the difference in the length of their lever arms.

Let it now be assumed that the live load of the vehicle is now increased so as to apply an additional force of 154 pounds at the pivot point 38, making a total force now acting on this point of 771 pounds. This additional force will act to move the vehicle frame, and parts of the device connected thereto, downwardly to a position such as shown in dotted lines in Figure 4. Since the axle block 42 remains fixed, there will be a rotative movement of the bell crank 40 which will move the rod 58 in a lengthening direction against the pressure of the spring 63. At the same time, rotation of bell crank 40 will move member 36 outwardly of member 35 and carry the fulcrum block 45 to a new position as shown in dotted lines. During this action, it will be observed that the length of the lever arm from the fulcrum to pivot point 38 remains constant, whereas the length of the lever arm from the fulcrum point to pivot point 37 has been increased ¾ inch. The increase in the latter lever arm length is just sufficient to keep the 2,160 pound force exactly in balance with the 771 pound force. This operation is termed the "weighing" operation of the device due to its similarity in action to that of an ordinary scale. During this action the flexible diaphragm remains in its normal central position and is not shifted within the chamber 20.

In the second condition of operation, the frame may be regarded, due to its mass inertia, as being stationary with reference to up and down movements of the axle due to road shocks.

Assuming now that the axle is moved upwardly to a position as shown in dotted lines in Figure 5, the lever 34 will be tilted and the member 36 will roll on the fulcrum block. During this movement of the member 36, the point of contact with the block will be shifted as shown in dotted lines towards the pivot point 38. In other words, with an increased force moving the axle upwardly, the lever arm of this force is decreased, and by the same token, the lever arm of the acting force of 2,160 pounds is increased. An unbalanced relationship of the forces is thus established, and the force of 2,160 pounds due to the increase in its effective lever arm will tend to reestablish a balanced condition of the forces. Under this condition of operation there will be a slight movement of the rod 24 and the flexible diaphragm within the chamber 20. Since the actual movements of the diaphragm and rod are relatively small compared to the volume content of the vacuum compartment, and since the atmosphere acting on the under side of the diaphragm is unconfined, the forces acting through the rod 24 will be substantially constant and there will be no tendency of the force creating medium, the atmosphere, to return energy to the system.

The up and down motions of the axle as just described usually follow each other in rapid succession, and thus tend to neutralize each other before the mass inertia of the "sprung" weight of the vehicle is disturbed. If, however, there is a preponderance of movement in one way or the other beyond the interval of inertia, the system is momentarily out of balance and the lever will instantly try to regain a horizontal balanced position, but will actually regain balance slowly and without being appreciably sensed by the passengers.

From the above description of the operation, it will be apparent that the device is also effective when the vehicle is in motion along its road in a straight line, but is retarded by braking action or accelerated by applied power, or when power either from within or outside the vehicle, is applied to start motion. The above described unbalanced and balancing operations will take place automatically.

Let it now be assumed that the vehicle is in motion along its road in a curved line or is turning a corner. The conditions of operation previously described will take place and, in addition, centrifugal force will cause a shifting of the "sprung" weight to the right or left, depending upon the curve of travel of the vehicle.

Assuming that the car is rounding a left hand curve, centrifugal force will cause the vehicle to press towards the right. Since the wheels of the vehicle are substantially in non-slipping relation with the road, the axle will be held against longitudinal movement. However, the axle block is free to move together with the other parts of the apparatus against the pressure of the spring 76. This lateral movement will cause the axle block 42 to rotate in a clockwise direction due to the spiral key 69 with which it is associated. This action of the axle block increases the length of the lever arm upon which the substantially constant force is acting, with the result that the pivot point 38 now becomes a fulcrum and the vehicle frame will be raised through the action of the lever on the block 45. On the left side of the vehicle, the devices will operate to lower this side of the vehicle frame.

These combined actions will keep the vehicle body on an even keel. Moreover, it will be apparent that this compensating feature may, by proper adjustment of the relationship of the parts, act to cause the side of the vehicle body on the outer arc of travel to actually ride even higher than the opposite side, producing a sort of automatic "banking" within the vehicle itself.

Referring to Figure 6, there is disclosed an alternative radius rod construction and arrangement of associated parts where it is connected to the vehicle axle. This alternative arrangement may, if desired, be utilized in lieu of the arrangement shown in Figure 1.

In the alternative arrangement, the radius rod 73' is provided adjacent its ends with vertically disposed pivotal connections, as shown at 77 and 78; and, instead of connecting the end 72 of the radius rod so that it may move axially of the axle, this end is retained against axial movement of the axle. The end 72, in this instance, is utilized as an abutment for one end of the spring 76 which, in this case, is disposed with its other end in engagement with the axle block 42. This arrangement enables the elimination of the arcuate extension 71 and provides a somewhat simplified construction.

Although it is preferable to provide the pivots 77 and 78 to enable lateral movements of the frame, it will be appreciated that these movements are not exceedingly great and, if desired, the pivots could be omitted, in which case the inherent resiliency of the radius rod would be relied upon to permit sufficient flexing thereof to enable lateral movements of the frame.

From the above description, it will be apparent that the present invention provides a suspension device which is stronger, more flexible and yet less reactive than previous devices of this character; which utilizes atmospheric pressure as the basic force producing medium; in which the forces due to load changes and road shocks will be opposed and balanced by a force of substantially constant uniform character; in which the acting forces are normally maintained in balanced relation, and which automatically is responsive to restore any unbalancing of these forces to a normal balanced relation; which operates to keep the body of the vehicle on an even keel when going around curves or turning corners; which may have its parts so adjusted or proportioned as to actually produce a "banking" effect within the vehicle itself; which results in a more uniform traction of the vehicle wheels; which reduces wear and tear on road surfaces, on the sprung portion of the vehicle and its material load; which provides greater comfort for vehicle passengers; and which enables the substitution of solid tires for pneumatic tires without sacrificing any of the above mentioned advantages.

It is, of course, to be understood that, although I have described in detail the preferred embodiment of my invention, the invention is not to be thus limited, but only insofar as defined by the scope and spirit of the appended claims.

I claim as my invention:

1. In a vehicle having sprung and unsprung parts, subject to variable weight forces, means operative to establish a substantially constant force, and means subject to said variable and constant forces connecting said sprung and unsprung parts including variable fulcrum means, and means for automatically varying said fulcrum in relation to said forces for maintaining a balanced relation between said constant force and the variable forces in the sprung and unsprung parts due to weight changes and road shocks.

2. In combination with a vehicle having sprung and unsprung parts, a cylinder closed at one end and open to atmosphere at its other end, said cylinder being supported by a sprung part of the vehicle, a piston in said cylinder, a flexible connection between the piston and cylinder, means for connecting the closed end of the cylinder to air exhausting means, whereby the pressure in the closed end of the cylinder may be reduced below atmosphere, a lever connecting said piston and an unsprung part of the vehicle, and means carried by said sprung part defining a shiftable fulcrum for said lever movable in accordance with variations in the forces acting on said sprung and unsprung parts.

3. In combination with a vehicle having sprung and unsprung parts, a cylinder closed at one end and open to atmosphere at its other end, said cylinder being supported by a sprung part of the vehicle, a piston in said cylinder, means for connecting the closed end of the cylinder to air exhausting means, whereby the pressure in the closed end of the cylinder may be reduced below atmosphere, a lever connecting said piston and an unsprung part of the vehicle, means carried by said sprung part defining a fulcrum for said lever, and means for shifting said fulcrum between the ends of said lever in response to its pivotal movement due to up and down movements of the sprung and unsprung parts.

4. In combination with a vehicle having sprung and unsprung parts, a cylinder closed at one end and open to atmosphere at its other end, said cylinder being supported by a sprung part of the vehicle, a piston in said cylinder, means for connecting the closed end of the cylinder to air exhausting means, whereby the pressure in the closed end of the cylinder may be reduced below atmosphere, a lever connecting said piston and an unsprung part of the vehicle, means carried by said sprung part defining a fulcrum for said lever, and means for shifting said fulcrum between the ends of said lever in response to lateral movements of the sprung part relative to the unsprung part.

5. In a device of the character described, a lever arm, a substantially constant force acting on one end of said arm, a variable force acting on the other end of said arm, and a rolling fulcrum for said arm intermediate its ends, whereby tilting movements of said arm due ot changes in the variable force act to vary the point of contact of the arm on said fulcrum.

6. In a vehicle suspension device, a lever fulcrumed on a sprung part of the vehicle and defining a pair of force arms connected for relative axial movements, one of said arms having vehicle load forces applied thereto and the other of said arms having a substantially constant force applied thereto, said forces acting through said arms to oppose each other, and means for simultaneously shifting said fulcrum and the vehicle load force arm to vary the relation of the fulcrum to the constant force arm, whereby the moments of said forces are maintained balanced during changes in the vehicle load.

7. In a vehicle suspension device, a pair of telescoped members, a fulcrum at the innermost end of one of said members having a sliding connection with a sprung part of the vehicle, whereby axial movement of said latter member will vary the fulcrum point relative to the other member, means connected with an unsprung part of the vehicle for applying the variable vehicle load forces to the outer end of said one of said members, means for applying a substantially constant force at the outer end of the other of said members, and means for telescopically moving said members in response to variations in the vehicle load forces.

8. In a vehicle suspension device, a lever fulcrumed intermediate its ends on a sprung part of the vehicle for swinging movements, means connected with an unsprung part of the vehicle for applying road shock forces to one end of said lever, means for applying a substantially constant force to the other end of said lever, the moments of said forces being in opposition, said lever and fulcrum having a rolling non-slipping engagement operative upon said swinging movements of the lever to vary the effective fulcrum point on the lever and restore said moments to balanced relation when they become unbalanced due to variations in the road shock forces.

9. In a vehicle suspension device, a lever fulcrumed intermediate its ends on a sprung part of the vehicle, means connected with an unsprung part of the vehicle for applying road shock forces to one end of said lever, means for applying a substantially constant force to the other end of said lever, the moments of said forces being in opposition, said lever and fulcrum being interconnected through a toothed rack and sector whereby the fulcrum point is shifted in response to tilting movements of said lever in a direction to restore said moments to a balanced state when they become unbalanced due to variations in the road shock forces.

10. In a vehicle suspension device, a lever having an extensible end section, a fulcrum for said lever slidable on a sprung part of said vehicle, means for applying a substantially constant force to the extensible end, means connected with an unsprung part of the vehicle for applying load and shock forces to the other end of said lever, said forces being normally balanced against each other, means operative in response to variations in the load forces to slide said fulcrum to change the fulcrum point relative to said constant force, said shock forces acting to tilt said lever, and a rolling engagement between said fulcrum and lever acting to change the fulcrum point in response to tilting movements of the lever.

11. In combination with a vehicle having sprung and unsprung parts, means supporting the sprung parts for unitary lateral shifting movements relative to the unsprung parts, means for producing a substantially constant force, means connecting the sprung and unsprung parts for balancing said force against the force due to the weight of the sprung part of the vehicle, means for normally maintaining said forces in balanced relation during increase and decrease of the weight force, and means responsive to the lateral shifting of the sprung parts for unbalancing said forces for compensating for tilting tendencies of the sprung parts when traversing a curved path.

12. In a suspension for a vehicle having sprung parts and unsprung parts arranged to engage a supporting medium, means for producing a force corresponding to the difference in pressure between a created vacuum and the pressure of the atmosphere, means connecting the sprung and unsprung parts and operative in normal position to balance the first force against the weight force of the sprung part of the vehicle, said first force acting through the connecting means to move the unsprung parts downwardly with a speed greater than the falling speed of the vehicle due to the action of gravity, when the supporting medium is relatively disengaged from the unsprung parts, and means directly and instantaneously responsive to movement of the unsprung parts by the first force for establishing an unbalanced condition between the forces in which the weight will predominate and act to return the forces to balanced relation with the connecting means in normal position.

13. A vehicle suspension and load balancing system including a lever having a first part and a second part telescopically connected, the first of said parts being acted upon by a substantially constant force and the second part being acted upon by the vehicle load forces, a fulcrum for said lever having pivotal engagement with the second part, and means for telescopically moving the second part on the first part in response to changes in the vehicle load forces, said fulcrum being movable with said second part, whereby the relative position of the fulcrum lengthwise of the first part is altered.

CLYDE Z. SMITH.